Patented Apr. 7, 1931

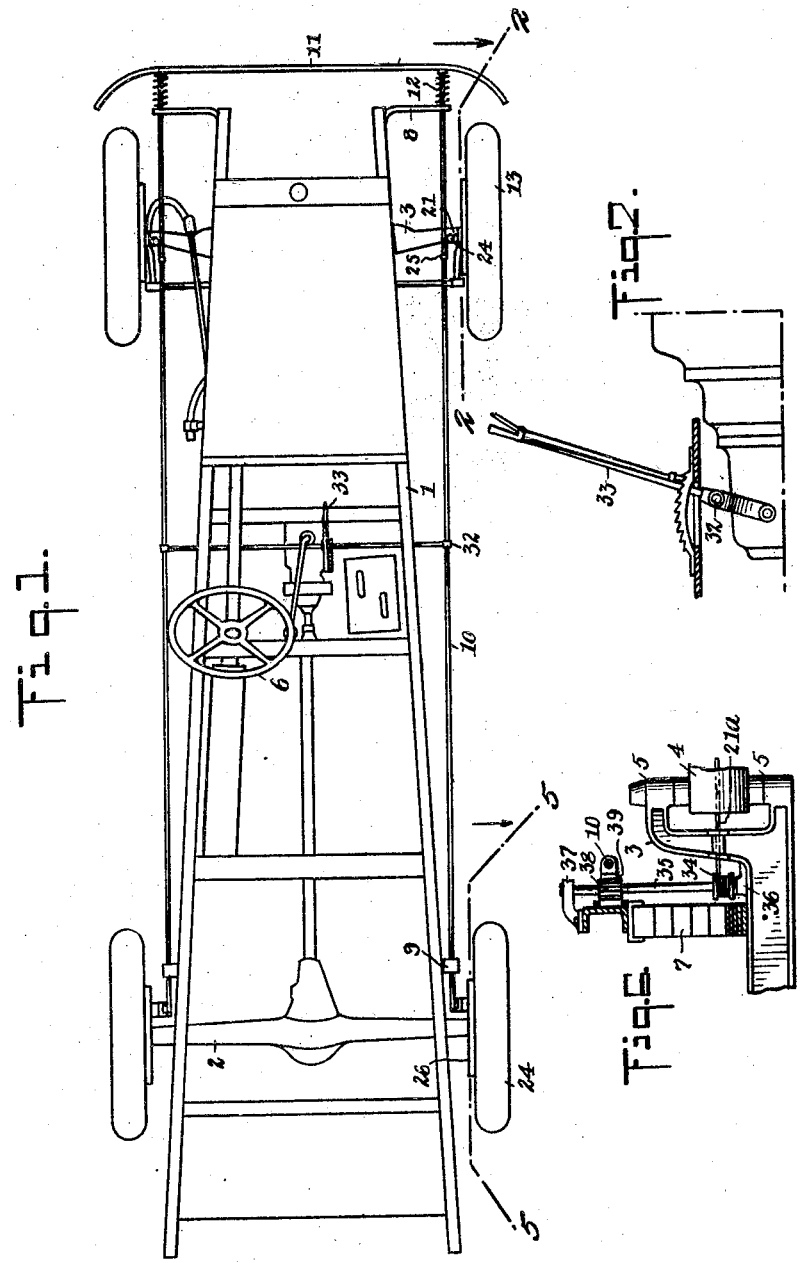

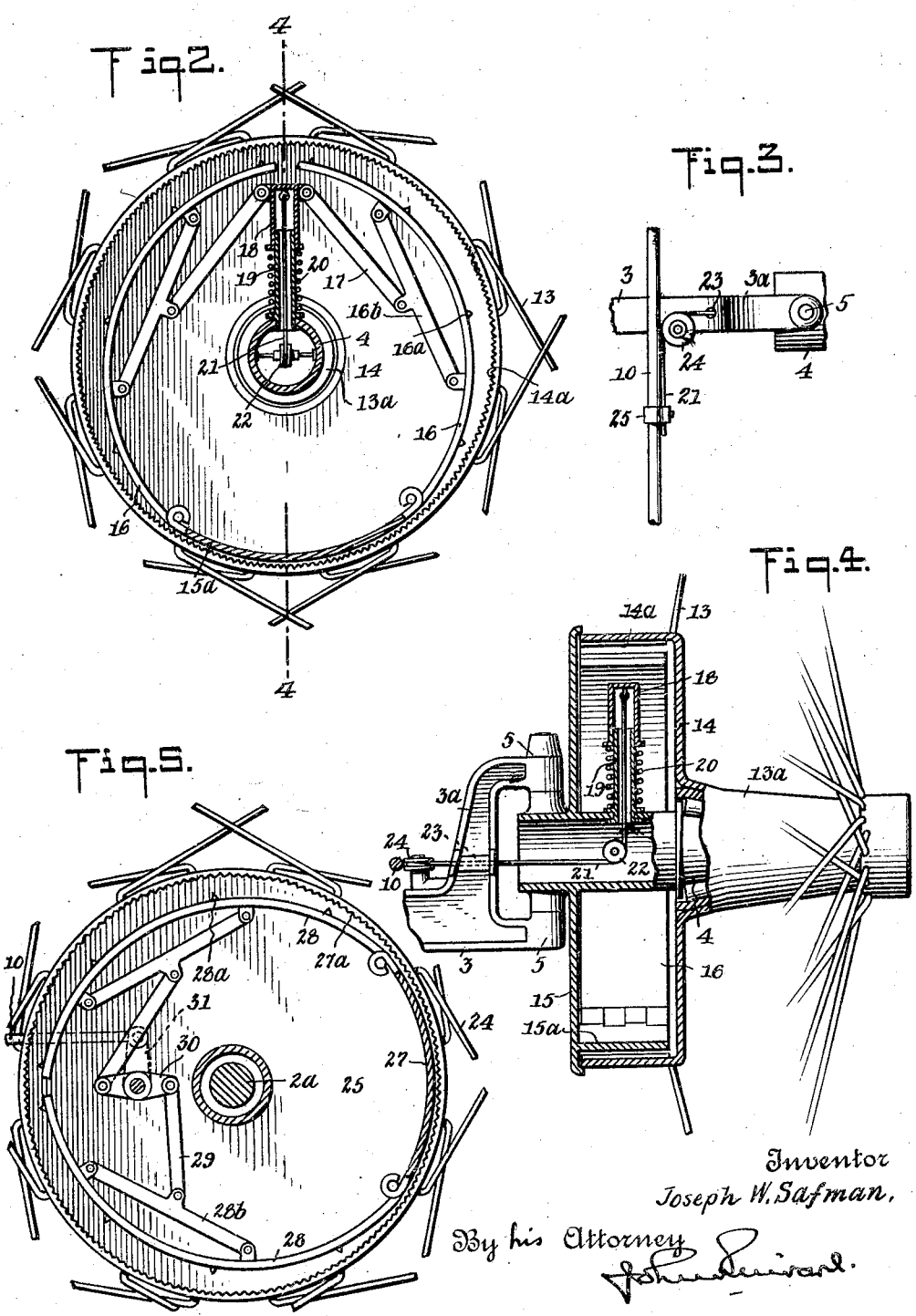

1,799,647

UNITED STATES PATENT OFFICE

JOSEPH W. SAFMAN, OF PATERSON, NEW JERSEY

BUMPER-OPERATED VEHICLE BRAKING MECHANISM

Application filed December 18, 1929. Serial No. 414,968.

This invention relates to automobiles and its principal object is to provide means, simple and inexpensive in construction and capable of being applied to any automobile already existing, whereby when a person or other object is struck the brakes will be set so as preferably to lock the wheels positively against rotation. In the best form of my invention the same is applicable to automobiles having four-wheel brakes as well as brakes only on the rear wheels, and to this end the mechanism is so constructed as to be accommodated to the steering movements of the front wheels. In the best form there is, further, provision whereby the brakes may bet set by the driver of the vehicle by hand so as to stop the vehicle before the person or other obstruction is actually struck.

In the drawings,

Fig. 1 is a plan of the chassis of an automobile embodying this invention;

Fig. 2 is a section taken generally on line 2—2, Fig. 1, but also through certain parts within a front wheel drum;

Fig. 3 is a plan of a detail;

Fig. 4 is a section on line 4—4, Fig. 2;

Fig. 5 is a section taken generaly on line 5—5, Fig. 1; but also through certain parts within a rear wheel drum;

Fig. 6 shows a modification of the detail appearing in Figs. 3 and 4; and

Fig. 7 illustrates how manual control of the braking mechanism is accomplished.

1 indicates the automobile chassis having the rear axle 2, provided with the wheel spindles 2a—Fig. 5, and the front axle 3, provided with the front wheel tubular bearing spindles 4 pivoted at 5 to turn in the forks 3a of the front axle for the purpose of steering, for which purpose these spindles may be connected together and with the steering wheel 6 in any well known way, and 7 is one of the springs by which the chassis is supported on the front axle.

In any suitable guides 8 and 9 at the sides of the chassis slide a pair of longitudinal rods 10 and these are connected at their front ends by a bumper 11, which may be of any usual type. The structure formed by these rods and bumper is normally held forward, as shown in Fig. 1, by a pair of springs 12 interposed between the bumper and the front guides 8. The springs should oppose little resistance to rearward displacement of said structure so that the latter will readily yield rearwardly to set the brakes as will appear, thus to check the vehicle in every case possible before serious injury is done to a person or object struck or to the vehicle itself.

Each front wheel 13 has its hub 13a (journaled on a spindle 4) formed with a brake drum 14 formed open at the inner side and through which the spindle 4 projects from its pivotal portion 5. This drum has an inside peripheral surface which is notched, at 14a as shown in Fig. 2. The spindle 4 has a disk 15 which closes the inner otherwise open side of this drum and this disk is formed with an arcuate flange 15a within the drum and close to its notched surface. Pivoted to this flange 15a at each end thereof is an arcuate brake member 16 having spaced teeth 16a and also having a bridge-piece 16b secured thereto at each end and arranged in a chord thereof. To the middle of each bridge-piece is attached a link 17 pivotally connecting the same with a sleeve 18 telescopically guided by a tubular stem 19 which projects radially from the spindle 4. A spring 20, interposed between the spindle 4 and the inner end of the sleeve, normally acts through the sleeve and links to hold the brake members 16 retracted. To the upper end of the sleeve is attached a cable 21 which extends through the sleeve and stem and around a pulley 22 journaled axially in the spindle, reaching through a hole 23 in the adjoining fork 3a, whereupon it extends around a pulley 24 on said fork and rearward, its rear end being attached by a clip 25 to the adjoining rod 10.

Each rear wheel 24 (journaled on axle spindle 2a) has its hub formed also with a brake drum 25 formed open at the inner side but closed by the disk 26 (Fig. 1) on spindle 2a which disk has an arcuate flange 27 within the drum. The inner periphery of the drum is notched, at 27a, and pivoted to the ends of flange 27 are the arcuate brake members 28 having spaced teeth 28a and also the bridge-pieces 28ᵇ secured thereto at each end and arranged in chords of the drum. To the middle of each bridge-piece is attached a link 29 pivotally connected with one end of a lever or rocker 30 which is fulcrumed in the disk 26, its axial portion protruding through the disk and having a crank 31 to which the rear end of the adjoining rod 10 is pivotally connected.

The two rods 10 may be connected by a cross-bar 32 which extends through or is otherwise connected with a hand lever 33.

Thus if the vehicle bumper encounters some obstacle, as a person, it will be repressed, and this action will be transmitted through the structure formed by the bumper and rods 10 to the described braking mechanism of both front and back wheels, which mechanism stops the rotation of the wheels, in the present case positively, because the teeth of the brake members engage the notches of the wheel drums. Also, if the lever 33 is shifted the braking of the vehicle will be effected in the same way.

The brake members in all cases obtain a very effective grip on the wheel drums not only because of the teeth-and-notch engagement possible but because they are so arranged and operated that the full length of each is active uniformly on the drum, this being largely due to the bridge pieces which apply the pressure to widely spaced portions of the brake members.

By utilizing cables, as 21, guided in the manner shown, it is possible to operate the front wheel braking mechanism notwithstanding each front wheel is movable, for steering, around a vertical axis (5).

In the modification of the part of the braking mechanism for the front wheels illustrated in Fig. 7 the cable 21a (corresponding to cable 21) extends to and is wound on a spool 34 forming part of a spindle 35 which is journaled in a bearing 36 on the axle and also in a bearing 37 on the chassis (sliding in the latter bearing as the springs yield), said spindle having a pinion 38 meshing with a rack 39 which may be secured on rod 10.

If the mechanism remains in braking engagement with the drums after application of the brakes, due to interlocking of 28a with 27a, the lever 33 may be used to release the mechanism.

Having thus fully described my invention what I claim is:

1. In combination, the front pair and rear pair of supporting wheels of an automobile, said front pair having hollow brake drums, a chassis-including supported structure carried by said wheels and on which they are journaled, the journal portions of said structure for the front wheels being tubular and pivotally movable for steering, another structure movable rearwardly in the first structure and including a front bumper, a brake mechanism arranged in each of said brake drums, and means, connecting the brake mechanism with the second structure and extending through said tubular journal portions, for transmitting braking movement to said mechanisms from said second structure on contact of the bumper with an obstacle in the forward path of the vehicle.

2. In combination, the front pair and rear pair of supporting wheels of an automobile, said front pair having hollow brake drums, a chassis-including supported structure carried by said wheels and on which they are journaled, the journal portions of said structure for the front wheels being tubular and pivotally movable for steering, another structure movable rearwardly in the first structure, a brake mechanism arranged in each of said brake drums, a flexible connection attached to each brake mechanism and extending longitudinally through each tubular journal portion and then bent rearwardly and attached to the second structure, and guides on the chassis for said connections at the bends therein, whereby on rearward movement of the second structure to operate said brake mechanisms.

3. In combination, with a vehicle chassis-including supported structure having a tubular wheel journal portion pivotally movable for steering, a wheel on said journal portion having a hollow brake drum, a braking means movable in the drum into braking contact therewith, a slidable member movable radially of and guided by said journal portion and operatively connected to the braking means to move therewith, a spring normally holding said slidable member and braking means in the position in which the latter is retracted from the drum, and means, extending through said journal portion to the chassis, to move said slidable member against the tension of the spring.

In testimony whereof I affix my signature.

JOSEPH W. SAFMAN.